United States Patent [19]
Roban

[11] Patent Number: 5,896,186
[45] Date of Patent: Apr. 20, 1999

[54] EYEGLASS ASSEMBLY HAVING PIVOTABLE RECEIVING MEANS

[76] Inventor: Philip K Roban, 1102 SE. 13th Ave., Minneapolis, Minn. 55414

[21] Appl. No.: 08/800,466

[22] Filed: Feb. 14, 1997

[51] Int. Cl.⁶ .............................. G02C 1/02; G02C 5/22
[52] U.S. Cl. .............. 351/110; 351/47; 351/121; 351/146; 351/153; 16/228
[58] Field of Search .................. 351/44, 47, 111, 351/115, 121, 124, 133, 146, 153, 110; 16/228

[56] References Cited

U.S. PATENT DOCUMENTS 5,638,146  6/1997  Nannini .................................. 351/153
5,764,330  6/1998  Simioni .................................. 351/121

FOREIGN PATENT DOCUMENTS 93022704  11/1993  WIPO .................................. 351/153

*Primary Examiner*—Huy Mai

[57] ABSTRACT

An eyeglass assembly has a pair of temples, each of which passes through an aperture in a lens. The temples are bent, and the holes oriented, such that the temples can pivot about the portion passing through the hole, allowing the temple to rotate between a wearing position and a storage position.

29 Claims, 9 Drawing Sheets

EYEGLASS ASSEMBLY HAVING PIVOTABLE RECEIVING MEANS

BACKGROUND OF THE INVENTION

1. Field of the Invention

This relates to eyeglasses, and more particularly to a method of constructing eyeglasses that fold for storage without the use of hinges.

2. Description of the Related Art

The fundamental problem of eyeglass design is the attachment of the optically important parts, the lenses, to the mechanical support structure, the frame, in such a way that the lenses are positioned correctly near the eyes, and in such a way that the frames are comfortable to wear. A vast number of cosmetically different frame types exist, but they embody only a few methods of joining frame to lens:

Full-frame: The frame surrounds the lens cosmetically and structurally with a rigid structure. The lens is either geometrically trapped in the frame, or is adhesively bonded inside.

Semi-rimless: The frame, incorporating the temples and nose bridge, wraps approximately halfway around the circumference of the lens, and is typically held into this structure by a length of flexible line running through a circumferential groove in the lens.

Rimless: The temples and nose bridge are separate, and each attached to the lens by brackets that touch the edge of the lens, held in place by small screws through the lens.

The rimless design is cosmetically pleasing, but all forces on the frame members are transmitted directly to the lens, so eyeglasses of this design are comparatively fragile. A pair of eyeglasses incorporating the presently disclosed invention could have rimless construction and appearance, great durability, and ease of fabrication.

SUMMARY OF THE INVENTION

This invention is directed to a pair of eyeglasses in which the nose bridge and temples are pivotally attached through the lenses or lens holding means, with the axis of rotation collinear and coincident with the portion of the nose bridge or temple actually passing through the lens or lens holding means.

In one aspect of the present invention, the holes are oriented, and the temples bent near the portion passing through the lens or lens holding means, such that the temples can fold close enough to the lenses for storage, and far enough out to wear on the head In another aspect of the present invention, the temples pass through resilient bushings mounted in the holes in the lenses; the exposed portion of the temple immediately adjacent to the bushing on both sides is threaded, and nuts that engage with these threads compress the bushing from both ends, forcing it against the walls of the hole in the lens and against the portion of the temple that passes through the bushing. By varying the compression of the bushing, the rotational friction on the temple is varied.

In another aspect of the invention, the nose bridge is attached to the lenses in the same manner as the temples.

In another aspect of the invention, the nose bridge and temples are fitted with secondary lens retention means.

In another aspect, the lenses are held in a lens holder, and the temples pass through holes in the lens holder, with the holes oriented and the temples bent near the portion passing through the lens holder such that the temples can fold close enough to the lens holder for storage, and far enough out to wear on the head.

In another aspect of the invention, the holes in the lens holder are fitted with resilient bushings.

In another aspect of the invention, the lens holder is fitted with secondary lens retention means.

To the accomplishment of the above and related objects, this invention may be embodied in the forms illustrated in the accompanying drawings, attention being called to the fact, however, that the drawings are illustrative only and that changes may be made in the specific construction illustrated and described, within the scope of the claims.

DETAILED DESCRIPTION OF THE PREFERRED EMBODIMENTS

According to an important feature of the invention, the temple rotates about a portion of itself to effect folding between wearing and storage positions.

According to another important feature of the invention, resilient bushings isolate the temples and nose bridge from the lens, while engaging all elements firmly.

According to another important feature of the invention, the temples and nose bridge serve as means for the retention of secondary lenses.

Figure 1:
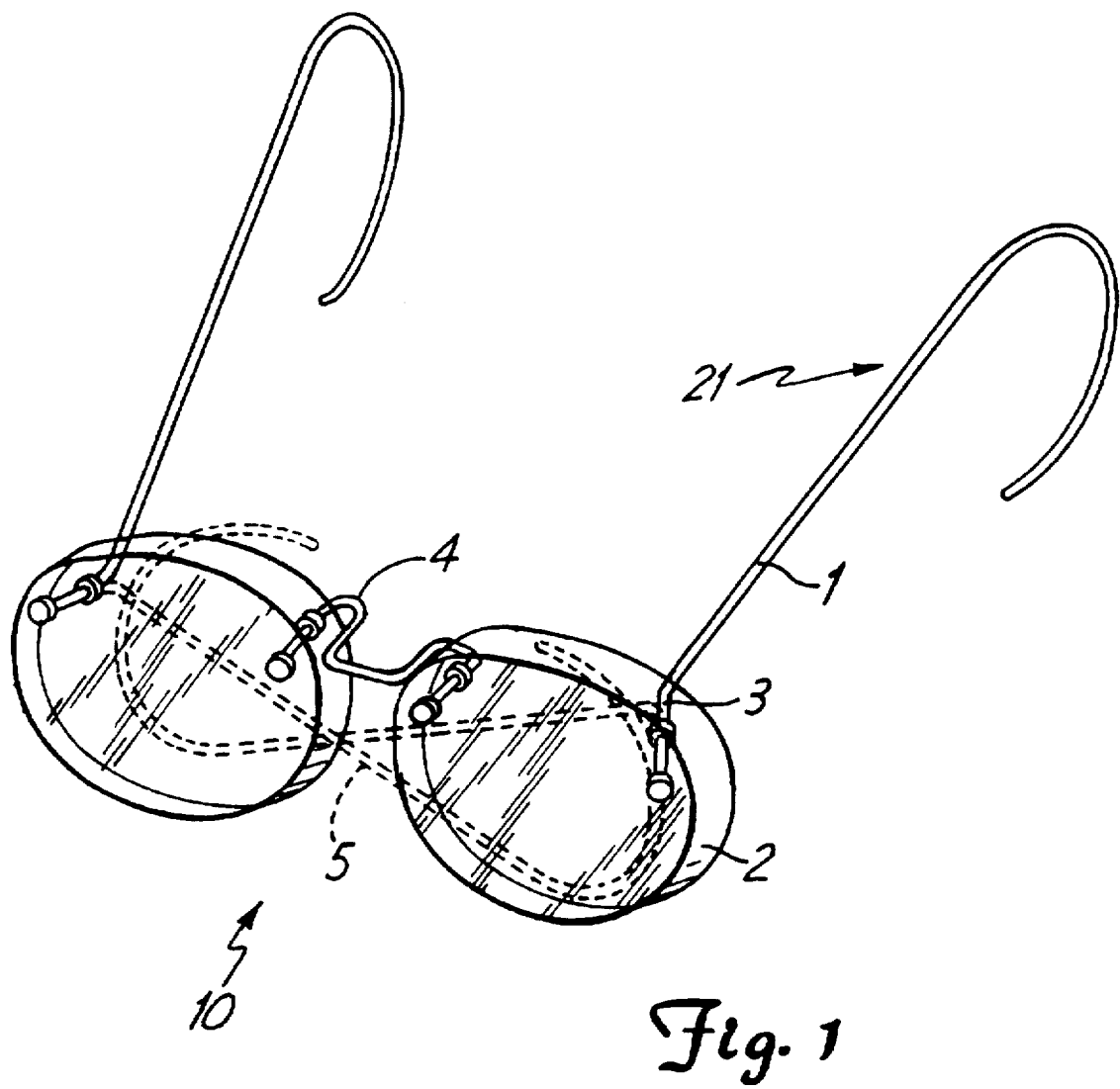
FIG. 1 shows a perspective view of an eyeglass assembly in accordance with one embodiment of the present invention.

Referring to FIG. 1, a preferred embodiment of an eyeglass assembly 10 according to this invention comprises a nose bridge 4, and on each side of nose bridge 4, a temple 1 which is adapted to pass through a lens 2 and has a portion 3 with bent configuration, which allows for rotation of the temple between wearing position and storage position 5. Each of the lenses 2 are connected together by nose bridge 4, which penetrates from the rear surfaces of the lenses 2.

Figure 2:
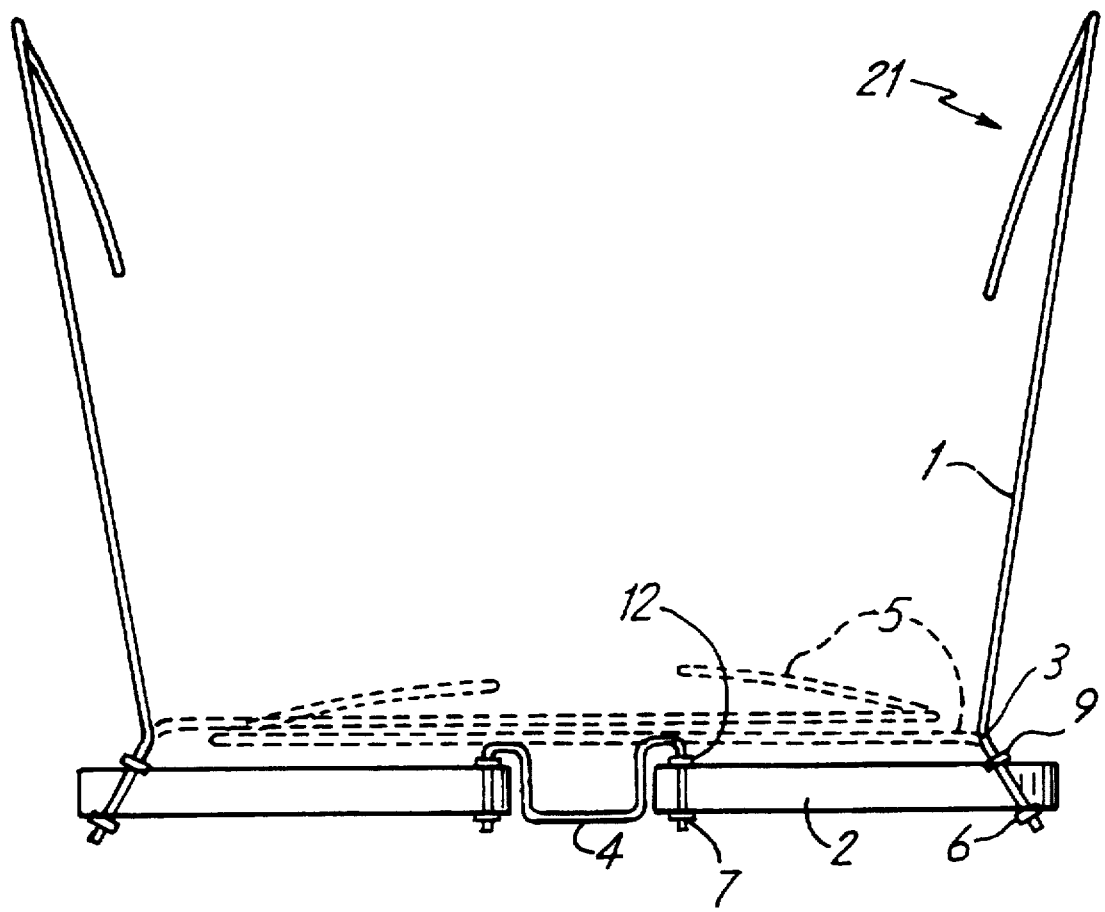
FIG. 2 shows a plan view of an eyeglass assembly in accordance with the present invention.

Referring to FIG. 2, a preferred embodiment of an eyeglass assembly 10 according to this invention comprises on each side of a nose bridge 4, a temple I which is adapted to pass through a lens 2, is prevented from moving into the lens 2 by retainer 9, is prevented from falling out of the lens 2 by retainer 6 and has a portion 3 with bent configuration, which allows for rotation of the temple between wearing position and storage position 5. Each of the lenses 2 are connected together by nose bridge 4, which penetrates from the rear surfaces of the lenses, is prevented from moving into the lens 2 by retainer 12, and is prevented from falling out of the lens 2 by retainer 7.

Figure 3:
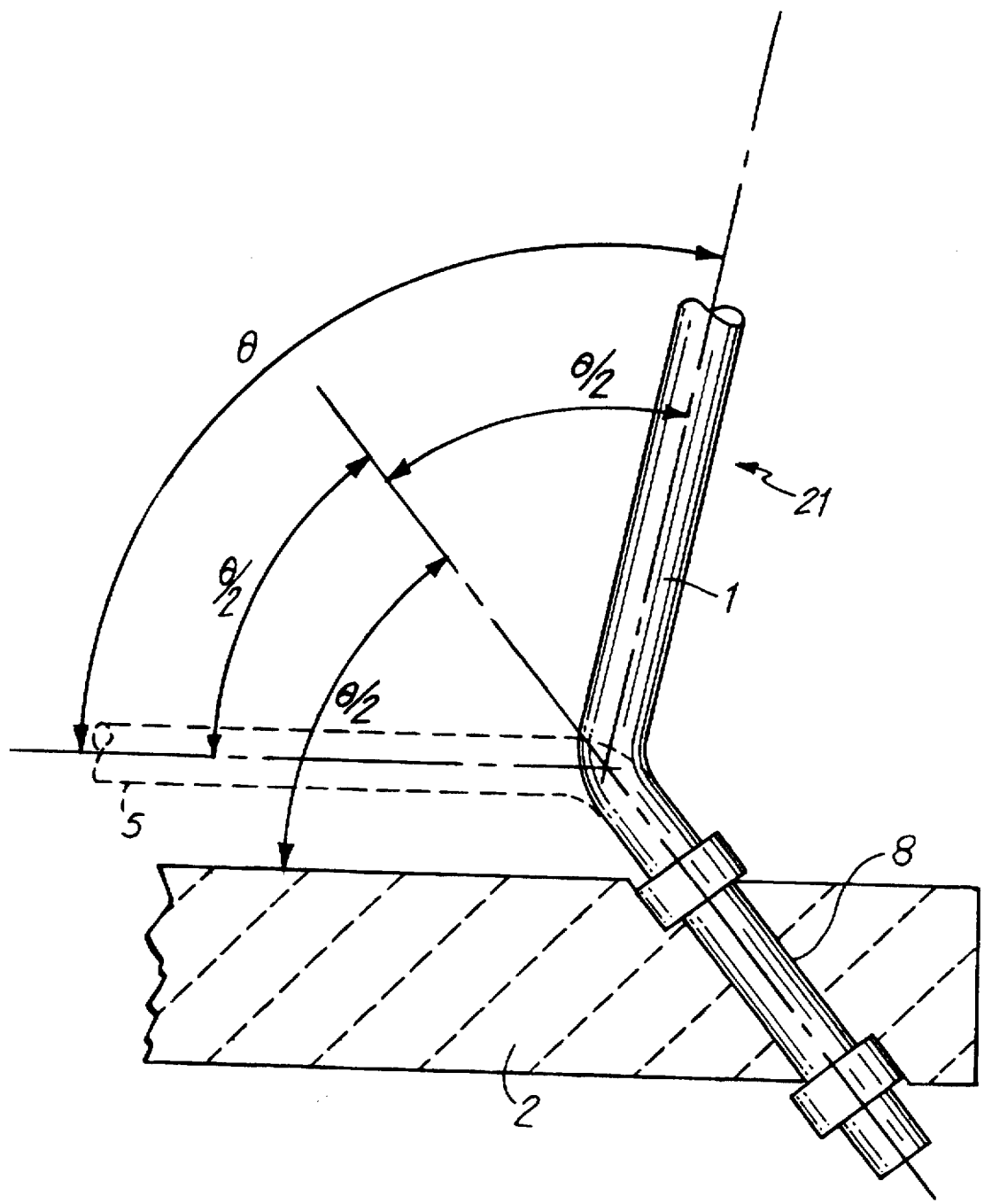
FIG. 3 shows, in a partial enlarged sectional view of an eyeglass assembly in accordance with the present invention, the portion of a temple that enters through the rear of a lens.

Referring to FIG. 3, the angle e between the main portions of temple I in its wearing and its storage positions is shown in relation to the angle θ/2 between the surface of the lens 2 and the axis of the aperture 8 in lens 2.

Figure 4:
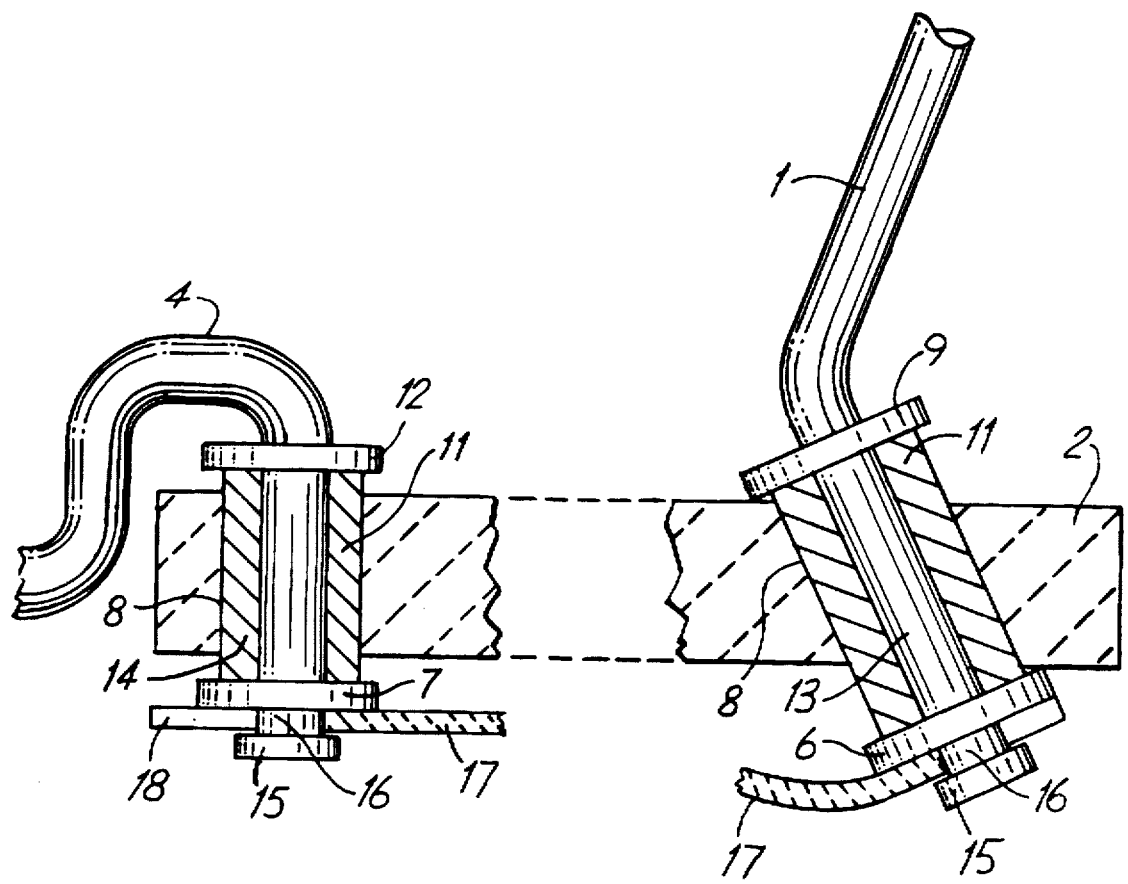
FIG. 4 shows, in a partial enlarged sectional view of an eyeglass assembly in accordance with the present invention, the portion of a temple that enters through the rear of a lens and the portion of a nose bridge that enters through the rear of a lens.

Referring to FIG. 4, the invention may be further refined by fitting apertures 8 in lens 2 with resilient bushings 11, compressed on each side by front temple retainer 6 and rear temple retainer 9 to bear against the portion 13 of temple 1 which passes through bushing 11, and by front nose bridge retainer 7 and rear nose bridge retainer 12 to bear against the portion 14 of nose bridge 4 which passes through bushing 11.

Figure 5:
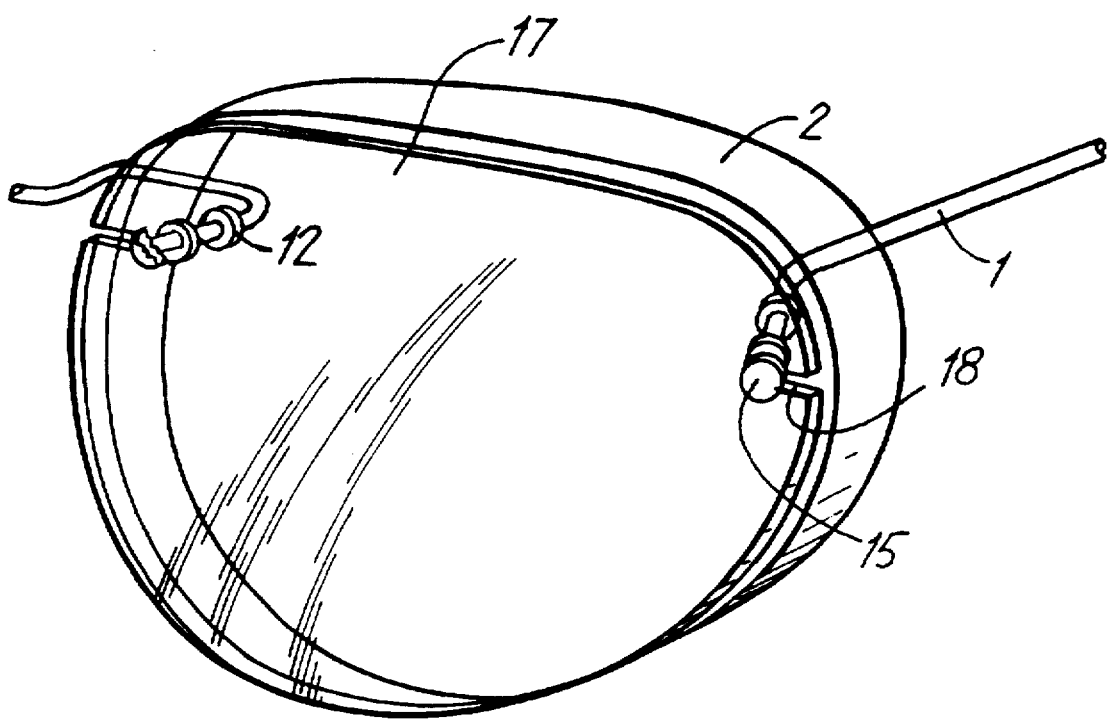
FIG. 5 shows, in a partial perspective view of an eyeglass assembly in accordance with the present invention, a secondary lens and secondary lens retention means.

Referring to FIGS. 4 and 5, the first preferred embodiment of the invention may be further refined by the fitting of means for the retention of secondary lenses 17, which have notches 18 that are very slightly wider than the diameter of spacers 16. Spacers 16 are very slightly thicker than the secondary lenses 17. Secondary lens 17 is further confined by disks 15, which are larger than the width of notches 18. The secondary lenses 17 may be tinted or polarized.

Figure 6:
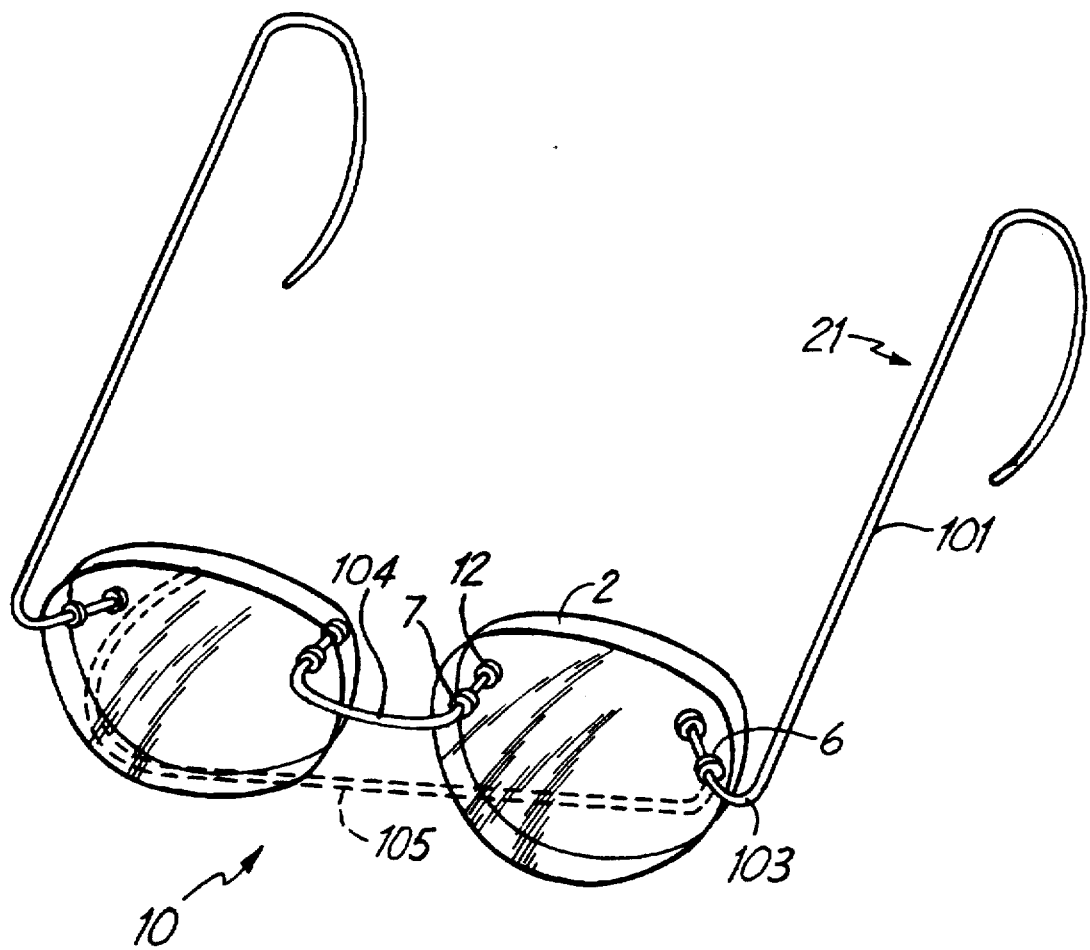
FIG. 6 shows a perspective view of an eyeglass assembly in accordance with another embodiment of the present invention.

Referring to FIG. 6, the temples and nose bridge of the invention can instead penetrate the lenses 2 from the front to form another preferred embodiment of the invention. The temple 101 has a portion 103 with bent configuration which allows the temple 101 to rotate into storage position 105 in front of the lens 2, and the nose bridge 104 penetrates apertures 8 from the front as well.

Figure 7:
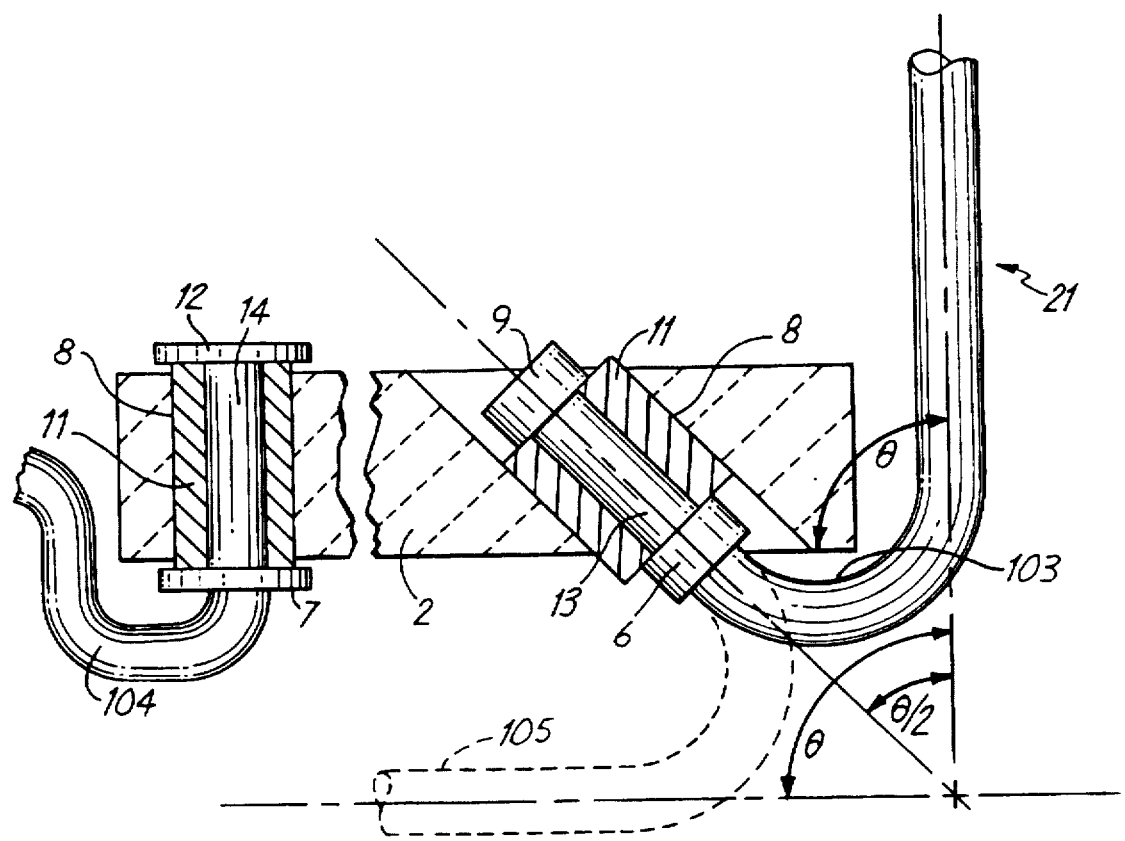
FIG. 7 shows, in a partial enlarged sectional view of an eyeglass assembly in accordance with the present invention, the portion of a temple that enters through the front of a lens in accordance with the present invention.

Referring to FIG. 7, the angle e between the main portions of temple 101 in its wearing and its storage position 105 is shown in relation to the angle θ/2 between the surface of the lens 2 and the axis of the aperture 8 in lens 2.

Referring again to FIGS. 6 and 7, the invention may be further refined by the fitting of apertures 8 with resilient bushings 11, compressed on each side by front temple retainer 6 and rear temple retainer 9 to bear against the portion 13 of temple 101 which passes through bushing 11, and by front nose bridge retainer 7 and rear nose bridge retainer 12 to bear against the portion 14 of nose bridge 104 which passes through bushing 11.

Referring again to FIGS. 4 and 7, the resilient bushings 11 may be of length shorter than, equal to, or longer than the depth of apertures 8. The resilient bushings 11 may also have an outer diameter smaller than, equal to, or larger than the diameter of apertures 8. The bushing retainers 6, 7, 9, and 12 may also have any size relative to the sizes of apertures 8 and bushings 11, except that the bushing retainers 6, 7, 9, and 12 must be of smaller diameter than apertures 8 when bushings 11 do not protrude from apertures 8, so that bushing retainers 6, 7, 9, and 12 do not make contact with lenses 2.

Figure 8:
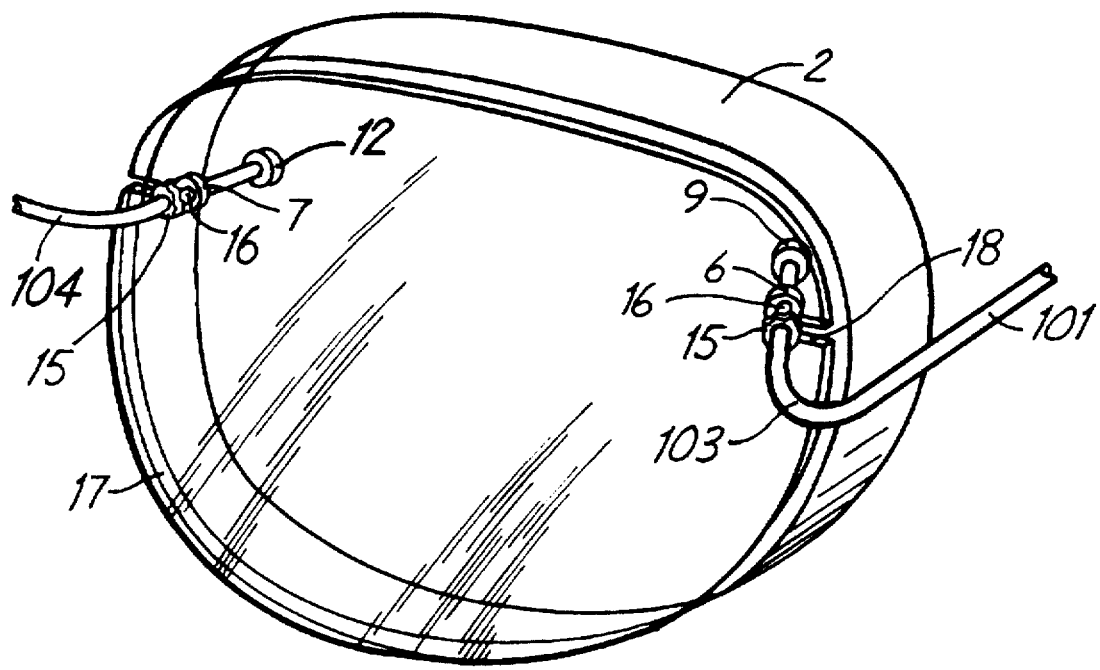
FIG. 8 shows, in a partial perspective view of an eyeglass assembly in accordance with the present invention, a secondary lens and secondary lens retention means.

Referring to FIG. 8, the invention may be further refined by the fitting of means for the retention of secondary lenses 17, which have notches 18 that are very slightly wider than the diameter of spacers 16. Spacers 16 are very slightly thicker than the secondary lenses 17. Secondary lens 17 is further confined by disks 15, which are larger than the width of notches 18. The secondary lenses 17 may be tinted or polarized.

Figure 9:
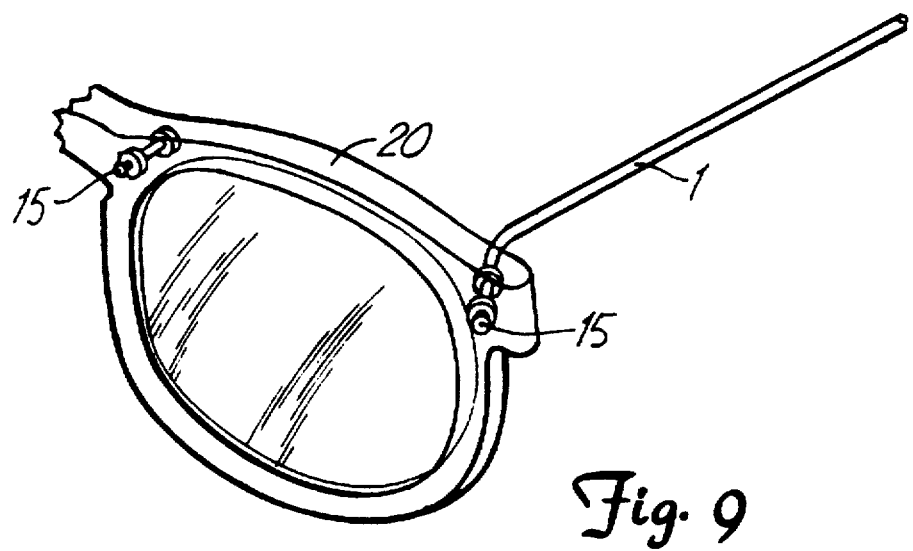
FIG. 9 shows a partial perspective view of an eyeglass assembly in accordance with another embodiment of the present invention.

Referring to FIG. 9, temple 1 is pivotably attached to a lens holder 20 to form another preferred embodiment of the present invention. The embodiment may in addition further comprise secondary lens retaining disks 15.

Figure 10:
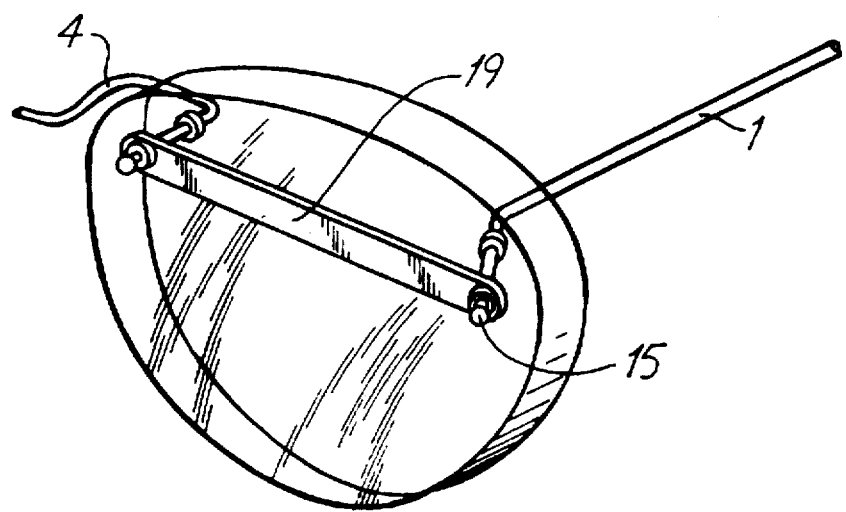
FIG. 10 shows a partial perspective view of an eyeglass assembly in accordance with another embodiment of the present invention.

Referring to FIG. 10, an eyeglass assembly in accordance with the present invention is further fitted with an external frame member 19, which is attached to temple I and nose bridge 4. The embodiment may in addition further comprise secondary lens retaining disks 15.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

I claim:

1. An eyeglass assembly comprising a pair of lenses connected to each other by a nose bridge means, and a pair of temple means, each of said temple means having a pivotable attachment for pivotably attaching said temple means to said respective lens through an outwardly oblique through hole formed at the opposite lateral side of said respective lens, each of said temple means having a bent configuration adjacent to said outwardly oblique through hole of said lens for allowing said temple means fitting over the ear of a wearer in a wearing position and being generally parallel to the surfaces of said lenses in a storage position, said pivotable attachment permitting rotation between said wearing and storage positions of said temple means.

2. The eyeglass assembly of claim 1, wherein said nose bridge means is pivotably connected to said lens by a pivotable connected means passing a respective aperture formed in each lens.

3. The eyeglass assembly of claim 1, wherein said pivotable attachment comprises a resilient bushing means and a bushing retention means for securing said bushing means in said outwardly oblique through hole.

4. The eyeglass assembly of claim 3, wherein said bushing retention means has size equal to the size of said outwardly oblique through hole.

5. The eyeglass assembly of claim 3, wherein said bushing retention means has size larger than the size of said outwardly oblique through hole.

6. The eyeglass assembly of claim 3, wherein said bushing retention means has size smaller than the size of said outwardly oblique through hole.

7. The eyeglass assembly of claim 1, wherein the axes of said outwardly oblique through holes are divergent respect to the axes of said pair of lenses.

8. The eyeglass assembly of claim 7, wherein said bent configuration includes at least a single bend in each of said temple means adjacent to said outwardly oblique through hole, said pivotable attachment permitting rotation between said wearing and storage positions of said temple means.

9. The eyeglass assembly of claim 1, wherein at least one of the nose bridge means and the pivotable attachment comprises means for the retention of auxiliary lenses attachable to said pair of lenses.

10. An eyeglass assembly comprising a pair of lenses pivotably connected to each other by a nose bridge means including a pivotable connected means passing a respective aperture formed in each lens, and a pair of temple means, each of said temple means having a pivotable attachment for pivotably attaching said temple means to said respective lens through an outwardly oblique through hole formed at the opposite lateral side of said respective lens, each of said temple means having a bent configuration adjacent to said outwardly oblique through hole of said lens for allowing the temple means fitting over the ear of a wearer in a wearing position and being generally parallel to the surfaces of said lenses in a storage position, said pivotable attachment permitting rotation between said wearing and storage positions of said temple means.

11. The eyeglass assembly of claim 10, wherein said pivotable attachment comprises a resilient bushing means and a bushing retention means for securing said bushing means in said outwardly oblique through hole.

12. The eyeglass assembly of claim 11, wherein said bushing retention means has size equal to the size of said outwardly oblique through hole.

13. The eyeglass assembly of claim 11, wherein said bushing retention means has size larger than the size of said outwardly oblique through hole.

14. The eyeglass assembly of claim 11, wherein said bushing retention means has size smaller than the size of said outwardly oblique through hole.

15. The eyeglass assembly of claim 10, wherein the axes of said outwardly oblique through holes are divergent respect to the axes of said pair of lenses.

16. The eyeglass assembly of claim 15, wherein said bent configuration includes at least a single bend in each of said temple means adjacent to said outwardly oblique through hole, said pivotable attachment permitting rotation between said wearing and storage positions of said temple means.

17. The eyeglass assembly of claim 10, wherein at least one of the nose bridge means and the pivotable attachment comprises means for the retention of auxiliary lenses attachable to said pair of lenses.

18. An eyeglass assembly comprising a pair of lenses pivotably connected to each other by a nose bridge means including a pivotable connected means passing a respective aperture formed in each lens, and a pair of temple means, each of said temple means having a pivotable attachment for pivotably attaching said temple means to said respective lens through an outwardly oblique through hole formed at the opposite lateral side of said respective lens, each of said temple means having a bent configuration adjacent to said outwardly oblique through hole of said lens for allowing the temple means fitting over the ear of a wearer in a wearing position and being generally parallel to the surfaces of said lenses in a storage position, said pivotable attachment permitting rotation between said wearing and storage positions of said temple means; wherein at least one of the pivotable connected means and the pivotable attachment comprises means for the retention of auxiliary lenses attachable to said pair of lenses.

19. The eyeglass assembly of claim 18, wherein said auxiliary lenses are tinted.

20. The eyeglass assembly of claim 18, wherein said auxiliary lenses polarize transmitted light.

21. An eyeglass assembly comprising a pair of lenses, a lens holding means for holding said pair of lenses, and a pair of temple means, each of said temple means having a pivotable attachment for pivotably attaching said temple means to said lens holding means through an outwardly oblique through hole formed at the opposite lateral side of said lens holding means, each of said temple means having a bent configuration adjacent to said outwardly oblique through hole of said lens holding means for allowing the temple means fitting over the ear of a wearer in a wearing position and being generally parallel to the surfaces of said lenses in a storage position, said pivotable attachment permitting rotation between said wearing and storage positions of said temple means.

22. The eyeglass assembly of claim 21, wherein said lens holding means comprises separate lens holding means for each of said lenses and a nose bridge means including a pivotable connected means for pivotably connecting to said separate lens holding means.

23. The eyeglass assembly of claim 22, wherein at least one of the nose bridge means and the pivotable attachment comprises means for the retention of auxiliary lenses attachable to said pair of lenses.

24. The eyeglass assembly of claim 21, wherein said pivotable attachment comprises a resilient bushing means and a bushing retention means for securing said bushing means in said inwardly oblique through hole.

25. The eyeglass assembly of claim 24, wherein said bushing retention means has size equal to the size of said outwardly oblique through hole.

26. The eyeglass assembly of claim 24, wherein said bushing retention means has size larger than the size of said outwardly oblique through hole.

27. The eyeglass assembly of claim 24, wherein said bushing retention means has size smaller than the size of said outwardly oblique through hole.

28. The eyeglass assembly of claim 21, wherein the axes of said outwardly oblique through holes are divergent respect to the axes of said pair of lenses.

29. The eyeglass assembly of claim 28, wherein said bent configuration includes at least a single bend in each of said temple means adjacent to said outwardly oblique through hole, said pivotable attachment permitting rotation between said wearing and storage positions of said temple means.

* * * * *